(12) United States Patent
Nagao

(10) Patent No.: US 8,526,725 B2
(45) Date of Patent: Sep. 3, 2013

(54) IMAGE PROCESSING APPARATUS INCLUDING A DIVISION-CONVERSION UNIT AND A COMPOSING UNIT, IMAGE PROCESSING METHOD, COMPUTER READABLE MEDIUM

(75) Inventor: Takashi Nagao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 114 days.

(21) Appl. No.: 13/214,754

(22) Filed: Aug. 22, 2011

(65) Prior Publication Data

US 2012/0148152 A1  Jun. 14, 2012

(30) Foreign Application Priority Data

Dec. 13, 2010  (JP) ................................ 2010-277171

(51) Int. Cl.
*G06K 9/00* (2006.01)
*G06K 9/34* (2006.01)

(52) U.S. Cl.
USPC ........................................................ 382/165

(58) Field of Classification Search
USPC ................. 382/162, 164, 165, 173, 190, 284; 358/1.2, 515, 518; 345/89, 102, 690
See application file for complete search history.

(56) References Cited

U.S. PATENT DOCUMENTS

| 7,471,807 | B2 * | 12/2008 | Asano et al. | 382/100 |
| 2005/0053259 | A1 * | 3/2005 | Asano et al. | 382/100 |
| 2009/0184915 | A1 * | 7/2009 | Tsai et al. | 345/102 |
| 2011/0069326 | A1 * | 3/2011 | Oishi | 358/1.2 |
| 2012/0148152 | A1 * | 6/2012 | Nagao | 382/165 |

FOREIGN PATENT DOCUMENTS

| JP | 3-289267 A | 12/1991 |
| JP | 6-102858 A | 4/1994 |
| JP | 11-263044 A | 9/1999 |
| JP | 3061230 A | 7/2000 |

\* cited by examiner

*Primary Examiner* — Amir Alavi
(74) *Attorney, Agent, or Firm* — Sughrue Mion, PLLC

(57) ABSTRACT

An image processing apparatus includes a division-conversion unit and a composing unit. The division-conversion unit extracts data representing N pixels (N is an integer of two or greater) from image data, divides the extracted data into k ($2 \leq k \leq N$) divided data elements such that at least one pixel is described in each of the k divided data elements, and converts each of the k divided data elements into a single piece of data by using a conversion table. The conversion table is provided in accordance with the number of pixels described in each of the k divided data elements and is used for converting the corresponding k divided data element into the single piece of data by performing conversion processing. The composing unit combines the single pieces of data so as to generate one-pixel output data which is reduced from the extracted N-pixel data with a reduction ratio of 1/N.

6 Claims, 9 Drawing Sheets

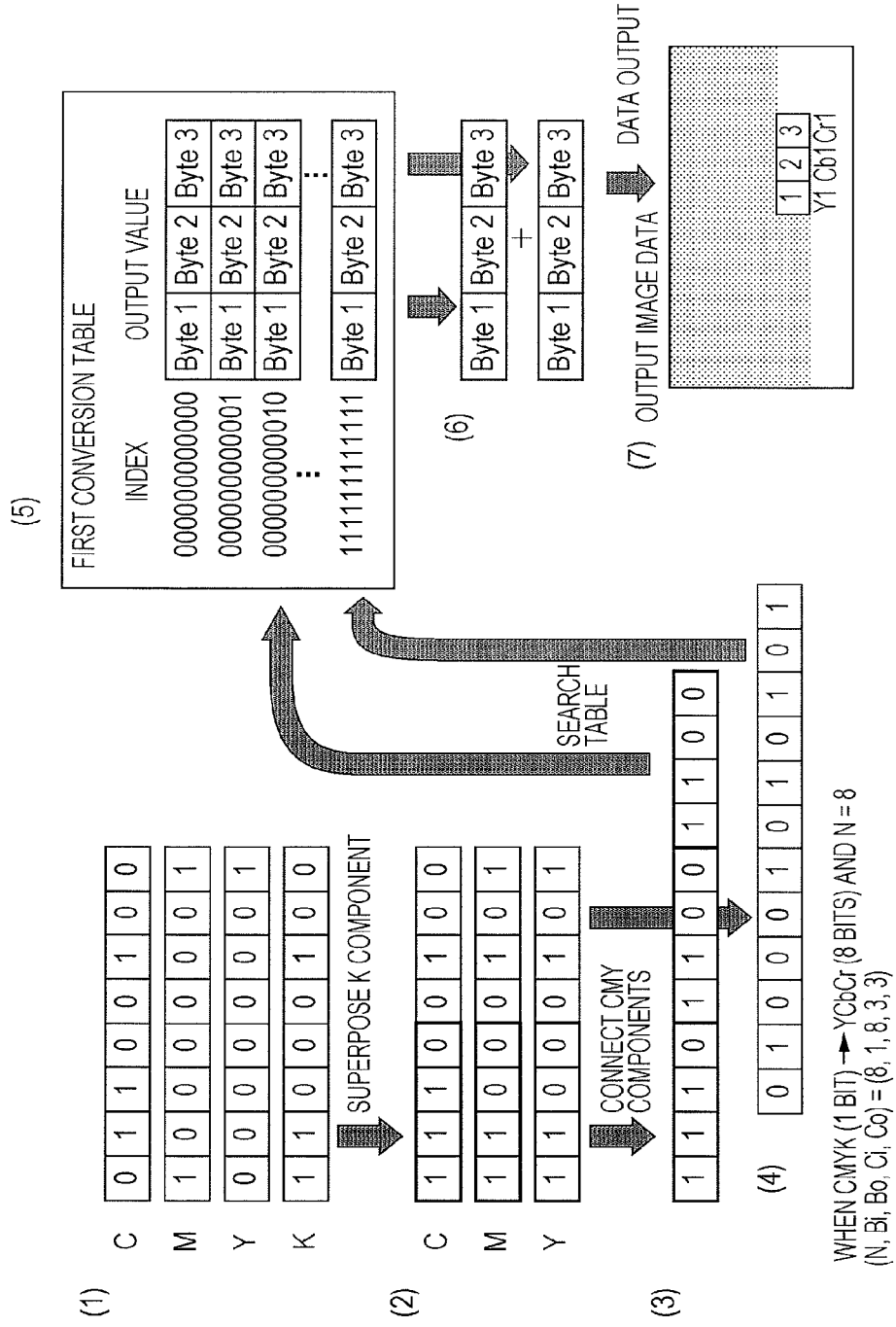

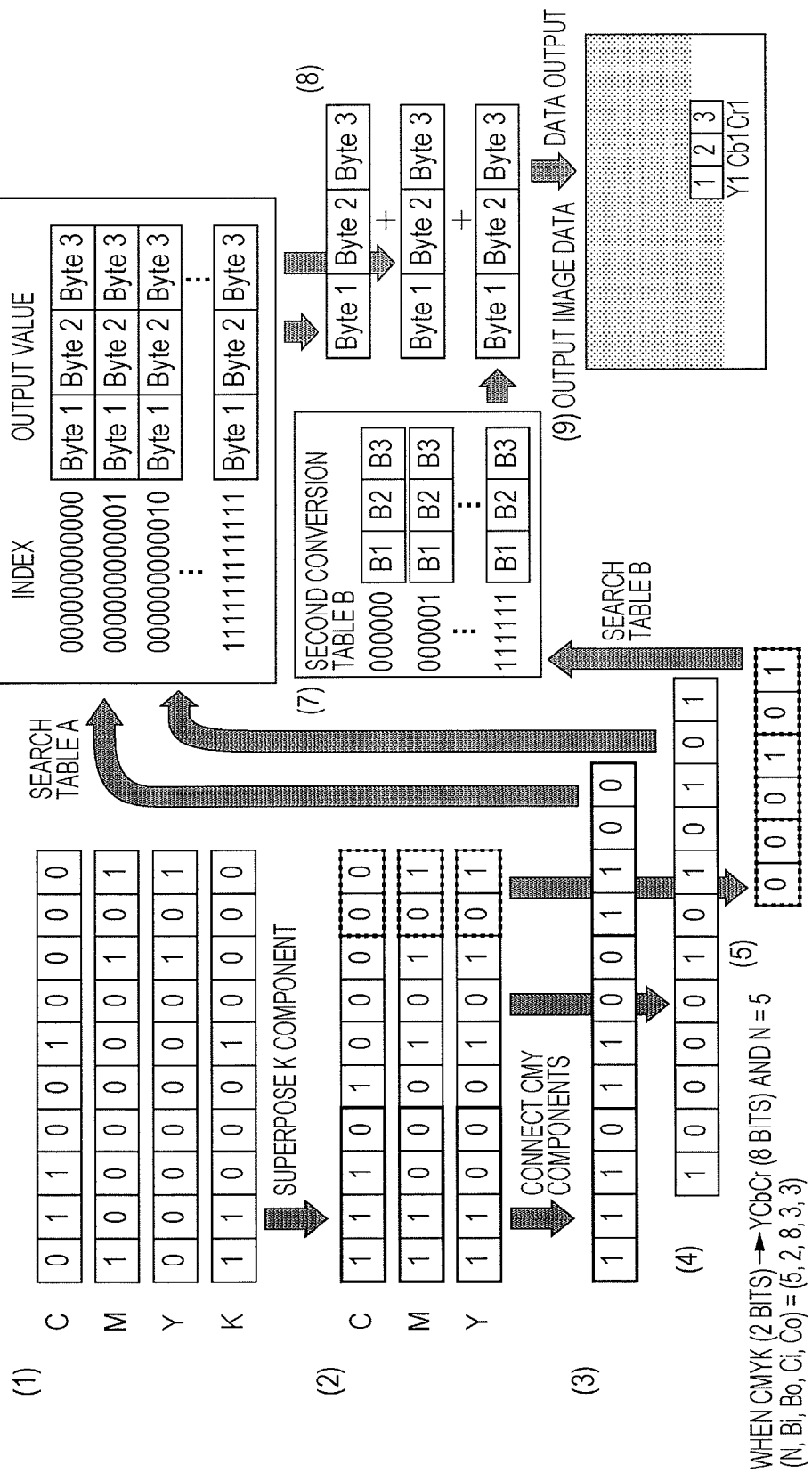

FIG. 9A

WHEN CMYK (1 BIT) → YCbCr (8 BITS) AND N = 8
(N, Bi, Bo, Ci, Co) = (8, 1, 8, 3, 3)

| 1 | 1 | 1 | 0 | 1 | 1 | 0 | 0 | 1 | 1 | 0 | 0 |
|---|---|---|---|---|---|---|---|---|---|---|---|

FIG. 9B

CALCULATION EXAMPLE (1) OF TABLE VALUES

```
for (i = 0; i <= 4095; ++i){
    in_c = 255*((number of pixel values 1 (Cyan) in i & 0xf00)) / 4;
    in_m = 255*((number of pixel values 1 (Magenta) in i & 0x0f0)) / 4;
    in_y = 255*((number of pixel values 1 (Yellow) in i & 0x00f)) / 4;
    cmy2ycbcr(in_c, in_m, in_y, out_y, out_cb, out_cr);
    table[i][0] = out_y / 2;
    table[i][1] = out_cb / 2;
    table[i][2] = out_cr / 2;
}
```

FIG. 9C

CALCULATION EXAMPLE (2) OF TABLE VALUES

```
for (i = 0; i <= 4095; ++i){
    in_c = 255*((number of pixel values 1 (Cyan) in i & 0xf00));
    in_m = 255*((number of pixel values 1 (Magenta) in i & 0x0f0));
    in_y = 255*((number of pixel values 1 (Yellow) in i & 0x00f));
    cmy2ycbcr(in_c, in_m, in_y, 4, out_y, out_cb, out_cr);
    table[i][0] = put_y;
    table[i][1] = put_cb;
    table[i][2] = put_cr;
}
```

IMAGE PROCESSING APPARATUS INCLUDING A DIVISION-CONVERSION UNIT AND A COMPOSING UNIT, IMAGE PROCESSING METHOD, COMPUTER READABLE MEDIUM

CROSS-REFERENCE TO RELATED APPLICATIONS

This application is based on and claims priority under 35 USC 119 from Japanese Patent Application No. 2010-277171 filed Dec. 13, 2010.

BACKGROUND

Technical Field

The present invention relates to image processing apparatuses, image processing methods, and computer readable media.

SUMMARY

According to an aspect of the invention, there is provided an image processing apparatus including: a division-conversion unit that extracts data representing N pixels (N is an integer of two or greater) from image data, divides the extracted data representing N pixels into k ($2 \leq k \leq N$) divided data elements such that at least one pixel is described in each of the k divided data elements, and converts each of the k divided data elements into a single piece of data by using a conversion table, the conversion table being provided in accordance with the number of pixels described in each of the k divided data elements and being used for converting the corresponding k divided data element into the single piece of data by performing conversion processing including at least one of number-of-bits conversion processing for converting the number of bits per pixel and color space conversion processing; and a composing unit that combines the single pieces of data obtained by converting the k divided data elements by use of the division-conversion unit so as to generate output data representing one pixel which is reduced from the extracted data representing N pixels with a reduction ratio of 1/N.

BRIEF DESCRIPTION OF THE DRAWINGS

Exemplary embodiment(s) of the present invention will be described in detail based on the following figures, wherein:

FIG. 7 illustrates an example of processing performed by the second converter;

FIG. 8 illustrates another example of processing performed by the second converter; and FIGS. 9A through 9C illustrate an example of the generation of a conversion table.

DETAILED DESCRIPTION

Figure 1:
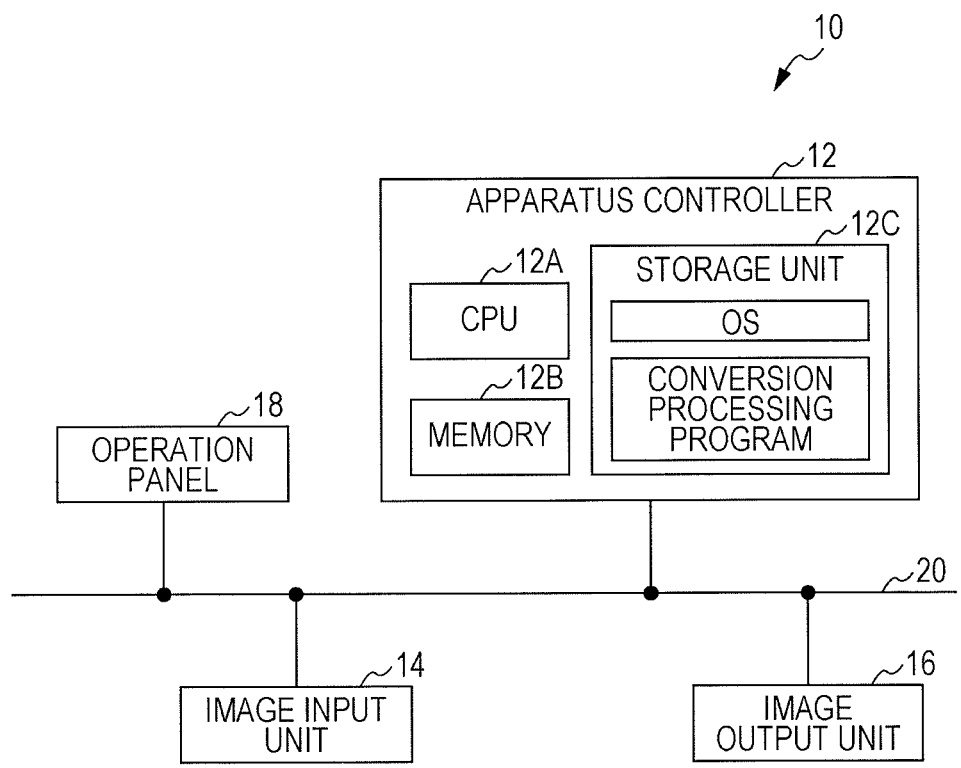
FIG. 1 is a schematic diagram illustrating an image processing apparatus according to an exemplary embodiment of the invention.

An exemplary embodiment of the invention will be described in detail below with reference to the accompanying drawings. FIG. 1 illustrates an image processing apparatus 10 according to this exemplary embodiment. The image processing apparatus 10 includes an apparatus controller 12 that controls operations of the individual components of the image processing apparatus 10, an image input unit 14 that receives an image, an image output unit 16 that outputs an image, and an operation panel 18. The apparatus controller 12, the image input unit 14, the image output unit 16, and the operation panel 18 are connected to one another via a bus 20.

The image input unit 14 may be a scanner that optically reads a document (e.g., a paper document) which is set in the image input unit 14 so as to obtain image data of the document. Alternatively, the image input unit 14 may be an interface that obtains image data from a portable memory, such as a compact-disc read only memory (CD-ROM) or a universal serial bus (USB) memory, or a communication unit that obtains image data from an external device via a network.

In this exemplary embodiment, image data which is input into the image input unit 14 is subjected to image processing, such as reduction processing and conversion processing, and is then input into the image output unit 16.

The image output unit 16 may be an image forming device that forms an image represented by input image data on recording paper, or may be a display device that outputs an image represented by the input image data by displaying the image on a display screen, such as a liquid crystal display (LCD).

The operation panel 18 includes a display unit that displays operation screens and an operation receiver, such as a numeric keypad or a touch panel, that receives operations from a user.

The apparatus controller 12 includes a microcomputer, etc., and more specifically, the apparatus controller 12 includes a central processing unit (CPU) 12A, a memory 12B, and a non-volatile storage unit 12C, such as a hard disk drive (HDD) or a flash memory. In the storage unit 12C, a program for the above-described conversion processing (conversion processing program) and an operating system (OS) that functions as a platform for executing the conversion processing program are stored.

Figure 2:
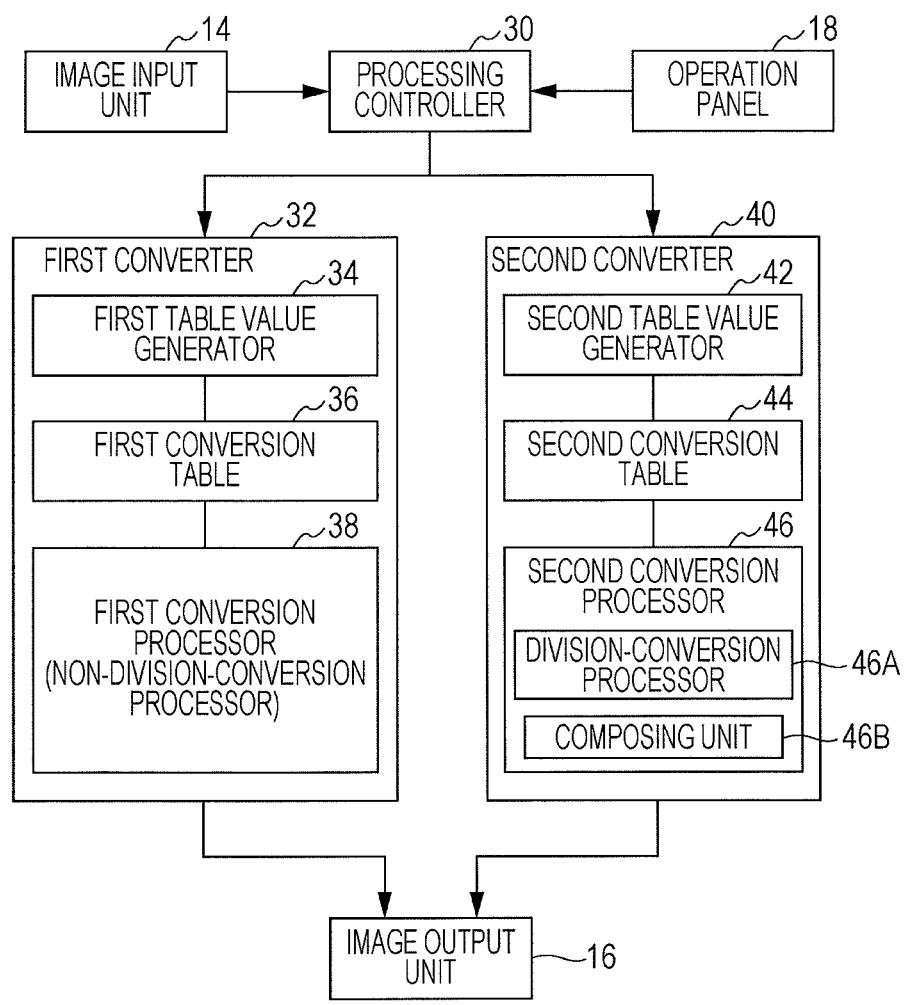
FIG. 2 is a block diagram illustrating the functional configuration of the image processing apparatus according to an exemplary embodiment of the invention.

FIG. 2 illustrates the functional configuration of the image processing apparatus 10 according to this exemplary embodiment. In FIG. 2, components the same as the components shown in FIG. 1 are designated by like reference numerals, and an explanation thereof is thus omitted.

The image processing apparatus 10 includes, as shown in FIG. 2, not only the image input unit 14, the image output unit 16, and the operation panel 18, but also a processing controller 30, a first converter 32, and a second converter 40. In both the first converter 32 and the second converter 40, processing using a conversion table is performed. In this exemplary embodiment, the conversion table used in the first converter 32 is referred to as a first conversion table 36, while the conversion table used in the second converter 40 is referred to as a second conversion table 44. The processing controller 30 inputs processing parameters representing processing conditions which define the reduction ratio used in the reduction processing and content of the conversion processing, and also inputs image data received from the image input unit 14 into one of the first converter 32 and the second converter 40 so as to cause the selected first or second converter 32 or 40 to perform image processing defined by the processing parameters.

Hereinafter, preprocessed image data that is input into the first converter 32 or the second converter 40 is referred to as input image data. The CPU 12A of the apparatus controller 12 executes the conversion processing program so as to implement the processing controller 30, the first converter 32, and the second converter 40.

The first converter 32 includes a first table value generator 34, the first conversion table 36, and a first conversion processor 38. The first converter 32 performs reduction processing and conversion processing on input image data and outputs the processed image data. In this exemplary embodiment, the conversion processing includes number-of-bits conversion processing, color space conversion processing, and plane-to-pixel interleave conversion processing.

The reduction processing is processing for reducing the size of image data with a reduction ratio of 1/N (N is a natural number) in the fast scanning direction (in the horizontal direction of the image) according to a mean value method. That is, in this exemplary embodiment, instead of reducing image data by sampling pixels of the image data, the image data is reduced from plural pixels of original data by performing computation processing using a mean value method. The number-of-bits conversion processing is processing for converting the number of bits per pixel, i.e., processing for converting the number of input bits Bi into the number of output bits Bo. For example, conversion from one-bit image data into 8-bit image data may also be called as conversion from two-level gradation image data into 256-level gradation image data.

As the color space conversion processing, known color space conversion processing may be performed, and the number of channels is converted from the number of input channels Ci into the number of output channels Co. For example, if a YMCK color space is converted into a YCbCr color space, the number of channels is converted from four channels into three channels. If the color space conversion processing is performed after superposing a K component on each of CMY components, four CMYK channels are first converted into three CMY channels by superposing the K component on each of the CMY components, and then, the three CMY channels are converted into three YCbCr channels. Such conversion processing will be discussed later.

The plane-to-pixel interleave conversion processing is processing for converting plane-interleave-format image data into pixel-interleave-format image data.

The first table value generator 34 determines table values of the first conversion table 36 used by the first conversion processor 38 on the basis of the processing parameters input from the processing controller 30, and sets the determined table values in the first conversion table 36.

More specifically, the first table value generator 34 generates, on the basis of the processing parameters input from the processing controller 30, table values of the first conversion table 36 and sets the generated table values in the first conversion table 36. The processing parameters include the reduction ratio N, the number of input bits Bi, the number of output bits Bo, the types of input/output color spaces, and the parameter α (an integer of one or greater) that defines the number of pixels which are simultaneously converted by using the first conversion table 36. The table values are generated for the first conversion table 36 in which the input values of α×N×Bi×Ci bits (i.e., the number of bits for α×N pixels) are associated with the output values of α×Bo×Co bits (i.e., the number of bits for α pixels). The output values of α×Bo×Co bits are values obtained by performing the number-of-bits conversion processing from Bi to Bo and the color space conversion processing which accompanies number-of-channels conversion processing from Ci to Co.

Figure 3:
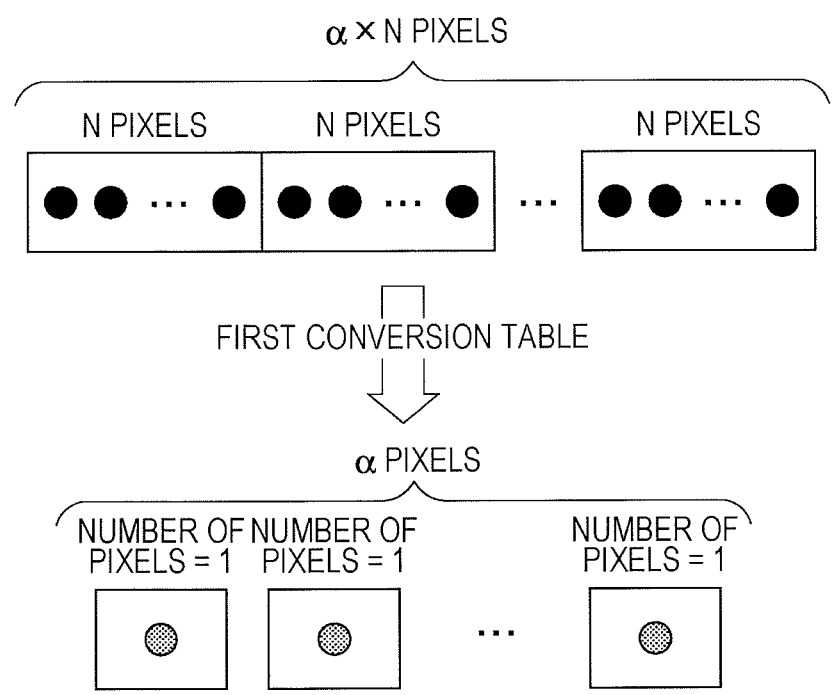
FIG. 3 illustrates an overview of processing performed by a first converter.

The first conversion processor 38 extracts, as shown in FIG. 3, (α×N)-pixel data from the input image data and converts (α×N)-pixel data into α pixel data. In other words, the first conversion processor 38 obtains from the first conversion table 36 the output value corresponding to the input value of the input image data representing (α×N) pixels and outputs the obtained output value. This is repeated until all the pixels forming the input image data are processed. As a result, image data subjected to reduction processing for reducing the input image data with a reduction ratio of 1/N and also subjected to conversion processing, such as the number-of-bits conversion processing, is output.

The processing performed by the first conversion processor 38 will be more specifically described. If the input image data is pixel-interleave-format image data, the first conversion processor 38 sequentially extracts (α×N×Bi×Ci) bit data (i.e., (α×N) pixel data) from the head, and outputs the output value (α×Bo×Co)-bit data (i.e., α pixel data) corresponding to the input value of the extracted data by referring to the first conversion table 36. If the input image data is plane-interleave-format image data, the first conversion processor 38 reads (α×N×Bi)-bit data from the image data of each of the channels forming the input image data, and connects the read (α×N×Bi)-data of the individual channels so as to generate (α×N×Bi)×Ci-bit data. Then, the first conversion processor 38 performs processing by referring to the first conversion table 36 in a manner similar to the pixel-interleave-format image data. In this case, the first table value generator 34 generates table values of the conversion table in which the input values obtained by connecting the data elements of the input channels of the plane-interleave-format image data are associated with the output values of the pixel-interleave-format image data.

If the color space conversion processing involves conversion from a CMYK color space into another type of color space, the first conversion processor 38 first superposes a K component on each of CMY components, and then, performs conversion processing by referring to the first conversion table 36. The superposition of the K component may be performed as follows. When Bi is one bit, OR operation is performed. When Bi is other than one bit, certain under color removable (UCR) computation or table processing comparable to the UCR computation is performed. In the case of the UCR computation or table processing comparable to the UCR computation, the K component may be added to the CMY components while restricting the upper value of the K component. Alternatively, a table for superposition processing having K/C, K/M, and K/Y as the input values may be generated, and then, the superposition processing is performed. Such superposition techniques are known techniques, and thus, a further explanation will not be given.

Unlike a division-conversion processor 46A of a second conversion processor 46, which will be discussed later, the first conversion processor 38 extracts (α×N)-pixel data and then outputs it by using one conversion table without dividing the extracted (α×N)-pixel data. Accordingly, the first conversion processor 38 may be hereinafter referred to as the "non-division-conversion processor".

The second converter 40 includes a second table value generator 42, the second conversion table 44, and the second conversion processor 46. The second converter 40 performs the above-described reduction processing and conversion processing on input image data and outputs the resulting data.

The second table value generator 42 determines, on the basis of processing parameters input from the processing controller 30, table values of the second conversion table 44 used for conversion processing performed by the second conversion processor 46. The second table value generator 42 then sets the determined table values in the second conversion table 44. Only one second conversion table 44 may suffice or plural second conversion tables 44 may be necessary depending on the case.

The generation of table values by the second table value generator 42 will be more specifically discussed. Unlike in the first converter 32, in the second converter 40, N pixels of input image data, which are necessary for obtaining one pixel of output image data, are first divided into k divided data elements (k is an integer from two to N), each of the k divided data elements representing at least one pixel. The second table value generator 42 determines, on the basis of processing parameters input from the processing controller 30, each of the table values of the second conversion table 44 which is provided in accordance with the number of pixels described in each of the k divided data elements. The processing parameters include the reduction ratio N, the number of input bits Bi, the number of output bits Bo, types of input/output color spaces, and the number k of data elements obtained by dividing the input image data. The numbers of pixels described in the individual divided data elements may be the same or may be different. In the second converter 40, one to k conversion tables are used, which will be discussed later. In this embodiment, each of the conversion tables used in the second converter 40 is referred to as the second conversion table 44. The second table value generator 42 generates, for each second conversion table 44, table values including input values, i.e., the numbers of bits assigned to the numbers of pixels described in the corresponding divided data elements, and including output values each having one pixel obtained by performing the number-of-bits conversion processing from Bi into Bo and the color space conversion processing on the input values.

Figure 4:
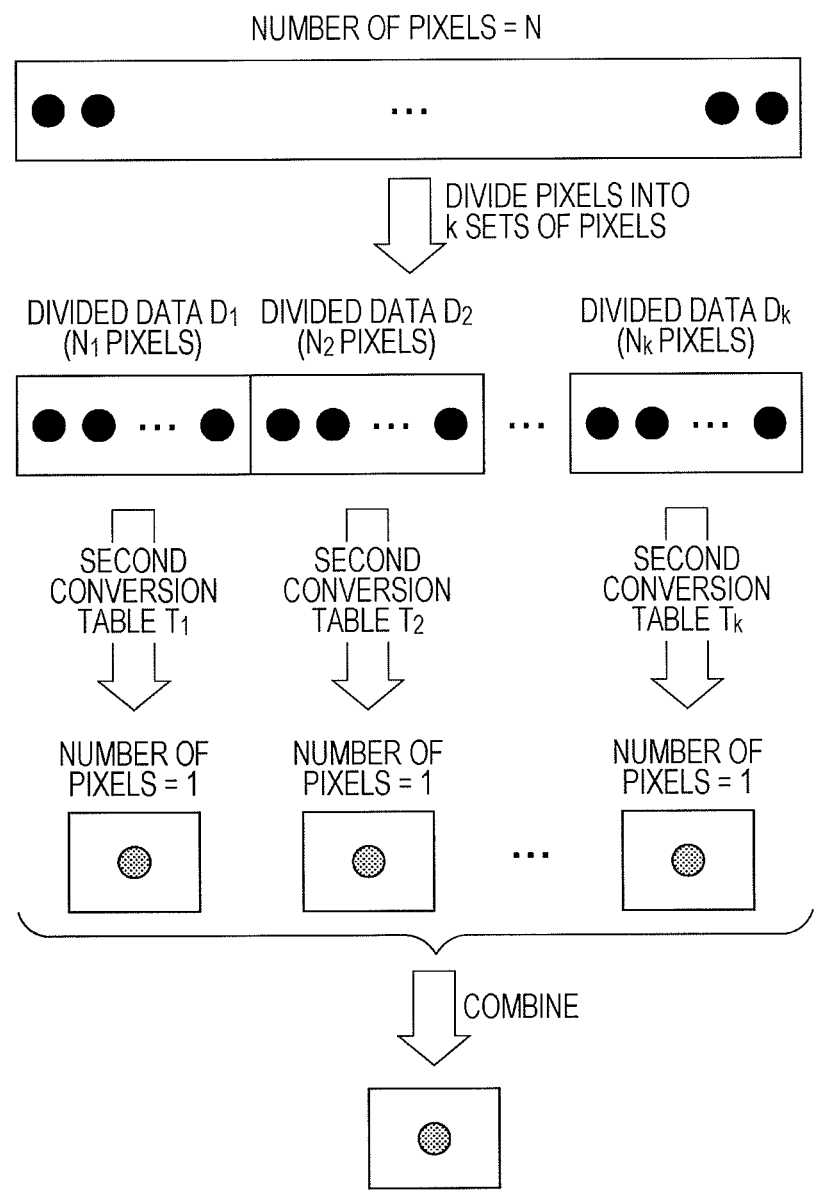
FIG. 4 illustrates an overview of processing performed by a second converter.

The second conversion processor 46 includes a division-conversion processor 46A and a composing unit 46B. The division-conversion processor 46A extracts, as shown in FIG. 4, data representing N pixels from input image data, divides the N pixel data into k divided data elements, and then, converts each of the k divided data elements into data representing one pixel by using the corresponding second conversion table 44. Then, the composing unit 46B combines the converted one-pixel data elements so as to generate one-pixel data which has been reduced with a reduction ratio of 1/N. The second conversion processor 46 repeats the processing performed by the division-conversion processor 46A and the composing unit 46B until all the pixels forming the input image data are processed. As a result, image data subjected to reduction processing for reducing the input image data with a reduction ratio of 1/N and also subjected to conversion processing, such as the number-of-bits conversion processing, is output. In this manner, each of the k divided data elements is converted into a single piece of data by using the corresponding second conversion table 44, and the converted pixel data elements are combined into one-pixel data. In this case, each of the data elements which have been converted by using the second conversion table 44 and which have not been combined is one-bit data, and the data which has been combined is also one-bit data. That is, the number of pixels is the same. Thus, each of the data elements which have not been combined is also referred to as one-pixel data.

The processing performed by the second conversion processor 46 will be more specifically described. If the input image data is pixel-interleave-format image data, the division-conversion processor 46A of the second conversion processor 46 sequentially extracts (N×Bi×Ci)-bit data (i.e., N pixel data) from the head, and divides the extracted data into k divided data elements such that each divided data element represents one or more pixels. It is noted that a bit string forming one pixel is not divided in half way. The same applies to the plane-interleave-format image data. The division-conversion processor 46A obtains the output value corresponding to the input value of each of the divided data elements from the corresponding second conversion table 44. The composing unit 46B combines the k output values and outputs the combined data as one-pixel image data (Bo×Co bits). If the input image data is plane-interleave-format image data, the second conversion processor 46 first reads each of the k bit strings obtained by dividing the image data (N×Bi) of each channel forming the input image data into k data elements. The second conversion processor 46 then connects the bit strings of the individual channels, and performs processing on the connected bit string, which serves as each divided data element, by using the second conversion table 44 in a manner similar to the processing performed in the case of the pixel-interleave-format image data. In this case, the second table value generator 42 generates table values of the second conversion table 44 in which the input values obtained by connecting the data elements of the input channels of the plane-interleave-format image data are associated with the output values of the pixel-interleave-format image data.

If the color space conversion processing involves conversion from a CMYK color space into another type of color space, as in the first conversion processor 38, the division-conversion processor 46A of the second conversion processor 46 first superposes a K component on each of CMY components, and then, converts the CMY color space into an output color space.

The conversion processing performed by the first converter 32 and the second converter 40 including number-of-bits conversion processing, color space conversion processing, and plane-to-pixel interleave conversion processing has been discussed as above by way of example. However, the conversion processing is not restricted to those kinds of processing.

For example, if number-of-bits conversion only is performed as the conversion processing, the number of input channels Ci and the number of output channels Co are omitted from the processing parameters. In this case, the first converter 32 performs the following processing. The first table value generator 34 generates table values of a conversion table in which the input values of α×N×Bi bits are associated with the output values of α×Bo bits obtained by performing the number-of-bits conversion processing from Bi to Bo. The first table value generator 34 then sets the generated table values in the first conversion table 36. The first conversion processor 38 extracts the (α×N×Bi)-bit data (i.e., α×N pixels) from the input image data, and converts the extracted data into α×Bo-bit data (i.e., α pixels) by using the first conversion table 36. As a result, the image data subjected to reduction processing for reducing the input image data with a reduction ratio of 1/N and subjected to number-of-bits conversion processing for converting Bi into Bo is output. The second converter 40 performs the following processing. The second table value generator 42 generates the table values of the second conversion table 44 which is provided in accordance with the number of pixels described in each of the k divided data elements. More specifically, the second table value generator 42 generates table values including input values, i.e., the numbers of bits assigned to the numbers of pixels described in the corresponding divided data elements, with the output values, i.e., one-pixel data elements obtained by performing the number-of-bits conversion processing for converting Bi of the input value into Bo. The second table value generator 42 then sets the generated table values in the corresponding second conversion table 44. The second conversion processor 46 extracts data representing N pixels from the input image data, and then converts each of the k divided data elements, which have been obtained by dividing the N pixel data, into one-pixel data by using the second conversion table 44. The second conversion processor 46 then combines the converted one-pixel data elements into one-pixel image data.

If color space conversion processing only is performed as the conversion processing, processing is performed accordingly in a manner similar to the above-described processing.

The mode of composition performed in the composing unit 46B of the second conversion processor 46 will be discussed in detail. The mode of composition varies depending on how the second conversion tables 44 are generated. For example, if a contribution ratio which is determined in accordance with the number of pixels described in each of the divided data elements has already been multiplied by each of the output values of the second conversion table 44, the k output elements obtained as a result of performing conversion using the second conversion table 44 are simply added. However, if the above-described contribution ratio has not been multiplied by each of the output values of the second conversion table 44, it is necessary to first multiply the contribution ratio by each of the k data elements and then to add the resulting k data elements.

The contribution ratio will be more specifically described with reference to FIG. 4. For example, if the reduction ratio is 1/5 and if k is 2, the number N of pixels (N=5) can be divided into 2, and more specifically, into a first number $N_1$ of pixels ($N_1$=3) and a second number $N_2$ of pixels ($N_2$=2). Accordingly, the number of pixels represented by first divided data $D_1$ may be 3 and the number of pixels represented by second divided data $D_2$ may be 2. In this manner, since the number of pixels of the first divided data $D_1$ and that of the second divided data $D_2$ are different, second conversion tables $T_1$ and $T_2$ are generated in accordance with the numbers of pixels of the first and second divided data $D_1$ and $D_2$, respectively.

The second conversion table 44 corresponding to the first divided data $D_1$ representing the number $N_1$ (=3) of pixels is referred to as the second conversion table $T_1$, while the second conversion table 44 corresponding to the second divided data $D_2$ representing the number $N_2$ (=2) of pixels is referred to as the second conversion table $T_2$. The two second conversion tables $T_1$ and $T_2$ are generated as follows. The data elements representing the individual three pixels are added and the total value is divided by three so as to generate one-pixel data. Such one-pixel data is further multiplied by the contribution ratio (weighted) of 3/5, and the resulting value is used as the output value of the second conversion table $T_1$. The second conversion table $T_1$ is thus generated. Meanwhile, the data elements representing the individual two pixels are added and the total value is divided by two so as to generate one-pixel data. Such one-pixel data is further multiplied by the contribution ratio (weighted) of 2/5, and the resulting value is used as the output value of the second conversion table $T_2$. The second conversion table $T_2$ is thus generated.

It is now assumed that the contribution ratio of 3/5 has already been multiplied by one-pixel data obtained by adding the data elements representing the individual three pixels and by dividing the total value by three, and that the resulting output value is set in the second conversion table $T_1$. It is also assumed that the contribution ratio of 2/5 has already been multiplied by one-pixel data obtained by adding the data elements representing the individual two pixels and by dividing the total value by two, and the resulting output value is set in the second conversion table $T_2$. In this case, two data elements obtained by converting the first and second divided data elements $D_1$ and $D_2$ by referring to the second conversion tables $T_1$ and $T_2$, respectively, can be simply added, thereby obtaining one-pixel data generated from the input N pixels and reduced with a reduction ratio of 1/5. In this manner, the mode of composition (referred to as a "first composition mode") employed when output values multiplied by contribution ratios are set as table values can be expressed by the following equation (1):

$$P = \sum_{n=1}^{k} P_n \quad (1)$$

where P is one-pixel data, which is the result of combining (adding) $P_n$, and $P_n$ is data obtained by converting the first divided data $D_1$ through the k-th divided data $D_k$ by using the second conversion tables 44.

On the other hand, it is now assumed that one-pixel data elements which have not been multiplied by contribution ratios are set in the second conversion tables 44 (in the above-described example, the output value obtained by adding the three-pixel data elements and by dividing the total value by three is set in the second conversion table $T_1$ and the output value obtained by adding the two-pixel data elements and by dividing the total value by two is set in the second conversion table $T_2$). In this case, instead of simply adding data elements $P_1$ through $P_k$ obtained by converting the divided data elements $D_1$ through $D_k$, respectively, by using the second conversion tables 44, the data elements $P_1$ through $P_k$ are multiplied by the corresponding contribution ratios and the resulting data elements are added. This mode of composition (referred to as a "second composition mode") can be expressed by the following equation (2):

$$P = \sum_{n=1}^{k} \frac{N_n}{N} P_n \quad (2)$$

where $N_n/N$ is the contribution ratio. If the contribution ratios for the k divided data elements are the same (e.g., if k is 2 and if the numbers of pixels of the divided data elements are the same, the contribution ratios for the divided data elements are 1/2), the k data elements $P_1$ through $P_k$ which have been converted by using the second conversion tables 44 may be added, and then, the total value may be multiplied by ½ (i.e., divided by two).

In the above-described example, divided data elements of the individual pixels are added and the total value is divided by the number of pixels, and the resulting value is further multiplied by the contribution ratio (or the resulting value is not multiplied by the contribution ratio). The table value calculated in this manner is set in the second conversion table 44. However, the table value to be set in the second conversion table 44 is not restricted to that calculated in the above manner. For example, the data elements representing the individual pixels may be added and the resulting value may be output as one-pixel data without being divided by the number of pixels or being multiplied by the contribution ratio. Such an output value may be set in the second conversion table 44 as the table value. In this case, the mode of composition is different from those described above. More specifically, the second conversion processor 46 adds the k data elements which have been converted by using the second conversion table 44, and the total value is multiplied by 1/N so as to determine one-pixel data which is reduced with a reduction ratio of 1/N in the fast scanning direction. The mode of composition (referred to as a "third composition mode") employed in this case can be expressed by the following equation (3).

$$P = \frac{1}{N} \sum_{n=1}^{k} P_n \tag{3}$$

In this manner, the mode of composition of individual data elements is different depending on how the table values to be set in the second conversion tables 44 are generated.

As the number of second conversion tables 44, k second conversion tables 44 may be provided, or a smaller number of second conversion tables 44 than k may be provided depending on the case. For example, if the number k of divided data elements is a divisor of N pixels, the number of pixels described in each of the divided data elements obtained by dividing the N pixel data by k may be the quotient (N/k) obtained by dividing N by k. In this case, at least one conversion table corresponding to the number of pixels described in each divided data element may be provided as the second conversion table 44 used by the second converter 40. As the second conversion table 44, one conversion table may be provided and may be used for all the divided data elements. Alternatively, 2 to k conversion tables may be provided, and at least one of them may be used for all the divided data elements.

In contrast, if the number k of divided data elements is not a divisor of N pixels, the same number of pixels as the remainder obtained by dividing N by k may be described in one of the divided data elements, and the same number of pixels as the quotient may be described in the remaining divided data elements. In this case, it is necessary to provide at least two conversion tables 44, i.e., the second conversion table 44 corresponding to the same number of pixels as the quotient and the second conversion table 44 corresponding to the same number of pixels as the remainder. If plural divided data elements, each of which represents the same number of pixels as the quotient, are generated, the number of conversion tables may be determined as in the case where the number k of divided data elements is a divisor of N pixels. More specifically, one conversion table may be provided and may be used for all the divided data elements representing the same number of pixels as the quotient, or 2 through k conversion tables may be provided, and at least one of them may be used for all the divided data elements representing the same number of pixels as the quotient.

Specific examples of the generation of table values will be discussed later.

Figure 5:
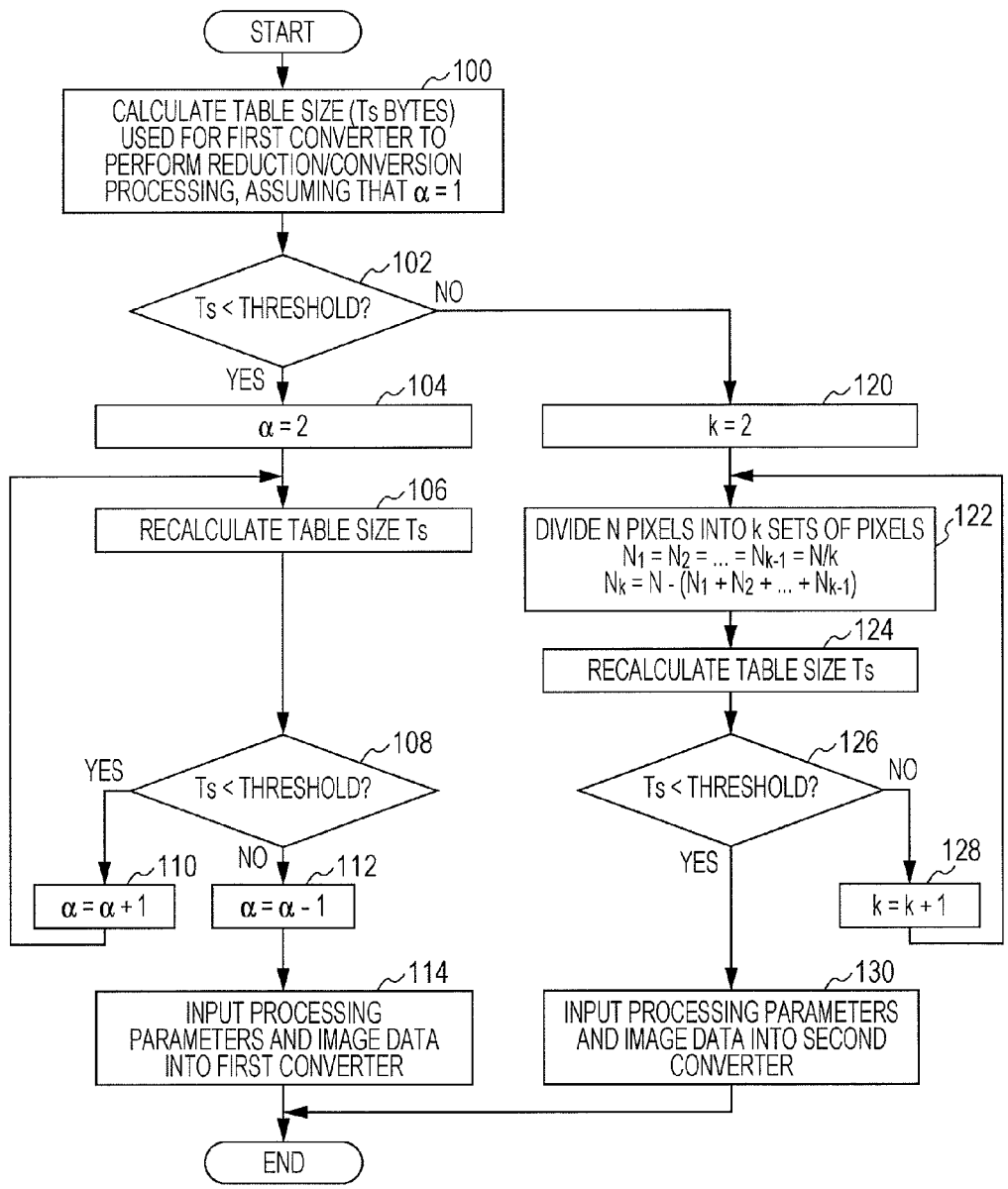
FIG. 5 is a flowchart illustrating a selection processing routine.

The processing controller 30 will be described in detail below. The processing controller 30 selects, on the basis of the size of the first conversion table 36 determined from the processing parameters (N, Bi, Bo, Ci, and Co), the first converter 32 or the second converter 40 to perform image processing on image data. The processing controller 30 then inputs the processing parameters and image data into the selected first or second converter 32 or 40 and causes the selected first or second converter 32 or 40 to start image processing. A selection processing routine executed by the processing controller 30 will be discussed below with reference to the flowchart of FIG. 5.

In step 100, the processing controller 30 calculates the size (table size) Ts of the first conversion table 36 used in the first converter 32 from the following equation (4). In this exemplary embodiment, the unit of the size Ts is bytes. However, it may be bits. The size Ts of the first conversion table 36 is calculated, assuming that $\alpha$ is 1.

$$Ts = (\alpha \times Bo \times Co/8) \times 2\hat{\,}(\alpha \times N \times Bi \times Ci) \tag{4}$$

where "^" is the symbol of a power, and $2\hat{\,}(\alpha \times N \times Bi \times Ci)$ is two to the power of $(\alpha \times N \times Bi \times Ci)$.

The reduction ratio 1/N, the number of input bits Bi, and the number of output bits Bo are specified by a user in advance through the use of the operation panel 18, and the number of input channels Ci and the number of output channels Co are specified from the types of input/output color spaces which are specified in advance through the use of the operation panel 18. At least one of those processing parameters may be set in advance in the image processing apparatus 10.

Then, in step 102, the table size Ts calculated in step 100 is compared with a predetermined threshold. If Ts is smaller than the predetermined threshold, the processing controller 30 selects the first converter 32 to perform image processing. Then, the processing controller 30 proceeds to step 104 in order to determine $\alpha$, which is one of the processing parameters input into the first converter 32. In step 104, $\alpha$ is set to be 2, and in step 106, the processing controller 30 recalculates the table size Ts using the above-described equation (4).

It is then determined in step 108 whether the recalculated table size Ts is smaller than the predetermined threshold. If the result of step 108 is YES, the process proceeds to step 110 in which 1 is added to $\alpha$. The process then returns to step 106. If it is determined in step 108 that the recalculated table size Ts is equal to or greater than the predetermined threshold, the process proceeds to step 112. In step 112, 1 is subtracted from $\alpha$ so that $\alpha$ returns to the value in one step before the table size Ts becomes equal to or greater than the predetermined threshold. This value is set as the value of the number $\alpha$ of output pixels, which is one of the processing parameters input into the first converter 32. That is, in steps 104 through 112, among the values $\alpha$ when the table size Ts is smaller than the predetermined threshold, the maximum value of $\alpha$ is determined.

Then, in step 114, the processing controller 30 inputs the processing parameters (N, Bi, Bo, the type of input/output color spaces, and $\alpha$) and image data into the first converter 32 so as to cause the first converter 32 to generate table values and to perform conversion processing.

On the other hand, if it is determined in step 102 that the table size Ts is equal to or greater than the predetermined threshold, the processing controller 30 selects the second converter 40 to perform image processing. The processing controller 30 then proceeds to step 120 in order to determine k, which is one of the processing parameters to be input into the second converter 40. In step 120, k is set to be 2, and in step 122, N pixels are divided into k sets of divided pixels.

An example of the division of N pixels will be discussed below. The numbers $N_1$ through $N_{k-1}$ of the first set of divided pixels through the (k−)-th set of divided pixels, respectively, are determined by dividing N by k, as expressed by the following equation (5). The result of the calculation may be truncated, or may be rounded up.

$$N_1 = N_2 = N_3 \ldots N_{k-1} = N/k \tag{5}$$

The number $N_k$ of the k-th set of divided pixels is found by the following equation (6).

$$N_k = N - (N_1 + N_2 + \ldots N_{k-1}) \tag{6}$$

This will be discussed by taking a specific example. If k is 2, N is divided into two sets of pixels, i.e., into $N_1$ and $N_2$, such that $N_1+N_2=N$. More specifically, $N_1=N/2$ (truncated) and $N_2=N-N_1$. Alternatively, $N_1=N/2$ (rounded up) and $N_2=N-N_1$.

The division of N pixels is not restricted to the above-described example, and N pixels may be divided into $N_1$ through $N_k$ having different number of pixels. No matter in which manner N are divided, N pixels are divided such that $N=N_1+N_2+N_3 \ldots N_k$ and such that each of the values $N_1$ through $N_k$ is an integer of one or greater.

In step 124, the table size Ts is recalculated. In this case, the total table size of the second conversion tables 44 used in the second converter 40 is recalculated. If different second conversion tables 44 corresponding to the k divided data elements are used, the table size Ts is calculated by the following equation (7).

$$Ts = \sum_{n=1}^{k} \{(Bo \times Co/8) \times 2^{\wedge}(N_n \times Bi \times Ci)\} \quad (7)$$

If the divided data elements have the same number of pixels, the common second conversion table 44 may be used. For example, when N pixels are divided into $N_1$ through $N_k$ in accordance with one of the above-described manners of dividing N pixels, if $N_1$ through $N_k$ are equal to each other (i.e., if N is divisible by k), only one second conversion table 44 suffices. Thus, the table size Ts is calculated by using the following equation (8).

$$Ts=(Bo \times Co/8) \times 2^{\wedge}((N/k) \times Bi \times Ci) \quad (8)$$

Even if $N_1$ through $N_k$ are equal to each other, different second conversion tables 44 may be generated. For example, if N is 8 and is divided into two divided data elements, assuming that $N_1=N_2$ is four, and if data elements obtained by converting $N_1$ and $N_2$ by using the common second conversion table 44 are combined, it is possible that only even values are obtained as the combined data. Thus, two second conversion tables 44, for example, may be provided. Then, the output value of one second conversion table 44 may be determined as a result of multiplying it by the contribution ratio and by truncating the resulting value, while the output value of the other second conversion table 44 may be determined as a result of multiplying it by the contribution ratio and by rounding up the resulting value.

When N pixels are divided in accordance with one of the above-described manners, if $N_1$ through $N_{k-1}$ are different from $N_k$, in this exemplary embodiment, the table size Ts is recalculated by using the following equation (9).

$$Ts=(Bo \times Co/8) \times \{2^{\wedge}(N_1 \times Bi \times Ci)+2^{\wedge}(N_k \times Bi \times Ci)\} \quad (9)$$

That is, the common second conversion table 44 is used for the divided data elements corresponding to $N_1$ through $N_{k-1}$, and the sum of the table size of the common second conversion table 44 and the table size of the second conversion table 44 used for the divided data element corresponding to $N_k$ is calculated as the total table size Ts.

If it is determined in step 126 that the recalculated table size Ts is equal to or greater than the predetermined threshold, 1 is added to k. The process then returns to step 122 and the above-described processing is repeated. If it is determined in step 126 that the table size Ts is smaller than the predetermined threshold, the value of k is set as k, which is one of the processing parameters input into the second converter 40. Then, in step 130, the processing controller 30 inputs the processing parameters (N, Bi, Bo, the types of input/output color spaces, and k) and image data into the second converter 40 so as to cause the second converter 40 to generate table values and to perform reduction/conversion processing.

An example of the calculation of the table size Ts when number-of-bits conversion and color space conversion are performed as the conversion processing has been described above. However, if color space conversion is not performed, the table size Ts when color space conversion is not performed is calculated. In this case, instead of equation (4), the following equation (10) is used.

$$Ts=(\alpha \times Bo/8) \times 2^{\wedge}(\alpha \times N \times Bi) \quad (10)$$

Additionally, instead of equation (7), the following equation (11) is used.

$$Ts = \sum_{n=1}^{k} \{(Bo/8) \times 2^{\wedge}(N_n \times Bi)\} \quad (11)$$

Instead of equation (9), the following equation (12) is used.

$$Ts=(Bo/8) \times \{2^{\wedge}(N_1 \times Bi)+2^{\wedge}(N_k \times Bi)\} \quad (12)$$

If number-of-bits conversion is not performed, but color space conversion is performed, in the above-described equations (10) through (12), Bo and Bi are substituted by Co and Ci, respectively. Also, since plane-to-pixel interleave conversion processing does not influence the table size, it can be ignored for calculating the table size.

The selection of the first converter 32 or the second converter 40 and the calculation of processing parameters ($\alpha$ and k) are described below by taking specific examples.

First Specific Example

It is now assumed that the reduction ratio is 1/2, the number of levels of gradation of input image data is 2 (1 bit), the number of levels of gradation of output image data is 256 (8 bits), the input color space is CMYK, and the output color space is YCbCr. In this case, the processing parameters (N, Bi, Bo, Ci, Co) are (2, 1, 8, 3, 3). In this case, the K component is superposed on each of the CMY components, and the resulting input color space Ci is 3.

If the table size Ts calculated using equation (4), assuming that $\alpha$ is 1, is smaller than the predetermined threshold, the first converter 32 is selected. If $\alpha$ is 2, the table size Ts of the first conversion table 36 is 24 KB since $\alpha \times N \times Bi \times Ci$ (input) is 12 bits and $\alpha \times Bo \times Co$ (output) is 48 bits. Thus, the resulting table size Ts is sufficiently small. If the table size when $\alpha$ is 2 is smaller than the predetermined threshold and if the table size Ts when $\alpha$ is 3 is equal to or greater than the predetermined threshold, $\alpha=2$ is set as the processing parameter.

Second Specific Example

It is now assumed that the reduction ratio is 1/8, the number of levels of gradation of input image data is 2 (1 bit), the number of levels of gradation of output image data is 256 (8 bits), the input color space is CMYK, and the output color space is YCbCr. In this case, the processing parameters (N, Bi, Bo, Ci, Co) are (8, 1, 8, 3, 3). As in the first specific example, the K component is superposed on each of the CMY components, and the resulting input color space Ci is 3.

The table size Ts calculated using equation (4), assuming that $\alpha$ is 1, is 48 MB (24-bit input/3-byte output). If this value is equal to or greater than the predetermined threshold, it is too large as the table size Ts. Accordingly, the second converter 40 is selected.

When the second converter 40 is selected, it is necessary to calculate the value k, and thus, the table size Ts is recalculated using equation (7) assuming that k is 2 (in this case, two divided data elements use the common second conversion table 44). Since N×Bi×Ci/k (input) is 12 bits and Bo×Co (output) is 24 bits, the table size Ts of the second conversion table 44 results in 12 KB, which is sufficiently small. If the table size Ts calculated when k is 2 is smaller than the predetermined threshold, k=2 is set as the processing parameter.

Third Specific Example

It is now assumed that the reduction ratio is 1/6, the number of levels of gradation of input image data is 16 (4 bits), the number of levels of gradation of output image data is 256 (8 bits), the input color space is Grey, and the output color space is Grey. In this case, the processing parameters (N, Bi, Bo, Ci, Co) are (6, 4, 8, 1, 1).

The table size Ts of the first conversion table 36 calculated using equation (4), assuming that α is 1, is 16 MB since α×N×Bi×Ci (input) is 24 bits and α×Bo×Co (output) is 8 bits.

If a sufficiently large memory capacity is provided in the image processing apparatus 10 to store a conversion table having a size of 16 MB and if priority is given to the speed, a large threshold is set in order to select the first converter 32. In contrast, if the memory capacity is small, a small threshold is set, at the sacrifice of the speed, in order to select the second converter 40. The table size Ts of the second conversion table 44 calculated when k is 2 is 4 KB, which is sufficiently small.

That is, for example, if it is desired that speed has priority over the efficient use of the memory capacity, a large threshold may be set. If it is desired that the efficient use of the memory capacity has priority over speed, a smaller threshold may be set.

A specific example of processing performed by the first converter 32 will be described below with reference to FIG. 6. In the example shown in FIG. 6, processing parameters (N, Bi, Bo, types of input/output color spaces, and α)=(2, 1, 8, CMYK→YCbCr, 2) are set in the first converter 32. In this case, the number of output pixels obtained by processing input pixel data at one time by the first conversion table 36 is 2 (α), and reduction processing is performed with a reduction ratio of 1/2 according to a mean value method. Accordingly, in order to generate two output pixels by simultaneous processing, four pixels of input image data are required. Since the type of input color space is CMYK and the type of output color space is YCbCr, Ci is 3 (K component is superposed on each of CMY components) and Co is 3.

Figure 6:
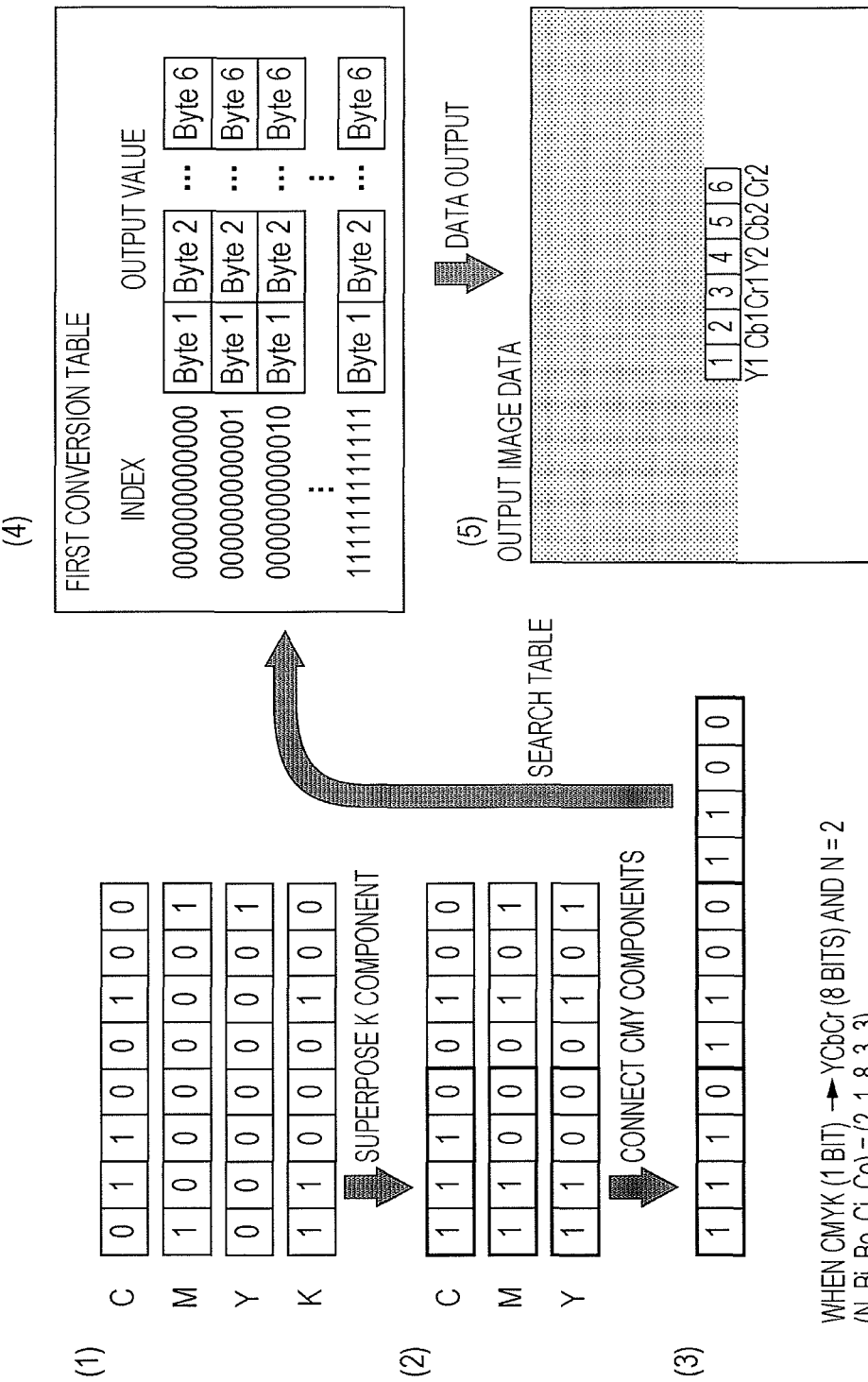
FIG. 6 illustrates an example of processing performed by the first converter.

Thus, the first table value generator 34 generates, as shown in (4) of FIG. 6, the first conversion table 36 having an input value (also called as an input index) having 12 bits (4 pixels×1 bit×3 channels) and an output value having 6 bytes (2 pixels×8 bits×3 channels). In this example, as the conversion processing, not only number-of-bits conversion and color space conversion, but also plane-to-pixel interleave conversion processing for converting plane-interleave-format input image data into pixel-interleave-format output image data is performed. Thus, the first table value generator 34 generates the first conversion table 36 for performing such conversion processing.

If, as shown in (1) of FIG. 6, the input image data is plane-interleave-format image data described in a CMYK color space in which one pixel is represented by two levels of gradation (one bit), the first conversion processor 38 first superposes, as shown in (2) of FIG. 6, a K component on each of CMY components. In this example, OR operation between K component and each of the CMY components is performed, whereby the K component is superposed on each of the CMY components. Subsequently, the first conversion processor 38 connects, as shown in (3) of FIG. 6, four pixels of the C components, four pixels of the M components, four pixels of the Y components in this order so as to generate 12-bit data. The first conversion processor 38 then obtains, from the first conversion table 36 shown in (4) of FIG. 6, the output value that is stored in association with the generated 12-bit data as the input value. The obtained 6-byte output value is output to the image output unit 16, as shown in (5) of FIG. 6.

A specific example of processing performed by the second converter 40 will be described below with reference to FIG. 7. In the example shown in FIG. 7, processing parameters (N, Bi, Bo, types of input/output color spaces, and k)=(8, 1, 8, CMYK→YCbCr, 2) are set in the second converter 40. In this case, reduction processing is performed with a reduction ratio of 1/8 according to a mean value method. Accordingly, in order to generate one-pixel output image data, 8 pixels of input image data are required. In the second converter 40, however, input image data is divided and the divided data elements are individually converted, and then, the converted individual data elements are combined so as to obtain one-pixel output image data. Thus, since k is 2, 4 pixels of input image data (8 pixels/2) are converted at one time by using the second conversion table 44. Since the type of input color space is CMYK and the type of output color space is YCbCr, Ci is 3 (K component is superposed on each of CMY components) and Co is 3.

Thus, the second table value generator 42 generates, as shown in (5) of FIG. 7, the second conversion table 44 having an input value (also called as an input index) having 12 bits (4 pixels×1 bit×3 channels) and an output value having 3 bytes (1 pixel×8 bits×3 channels). In this example, the divided data elements are converted by using the common second conversion table 44, and thus, only one second conversion table 44 is generated. In this example, as the conversion processing, not only number-of-bits conversion and color space conversion, but also plane-to-pixel interleave conversion processing is performed. Thus, the second table value generator 42 generates the second conversion table 44 for performing such conversion processing. If it is desired that the output value of the second conversion table 44 reflects the contribution ratio, the output value having a contribution ratio 1/2 is generated.

If, as shown in (1) of FIG. 7, the input image data is plane-interleave-format image data described in a CMYK color space in which one pixel is represented by two levels of gradation (one bit), the second conversion processor 46 first superposes, as shown in (2) of FIG. 7, a K component on each of CMY components. As in the case of the first conversion processor 38, in this example, OR operation between K component and each of the CMY components is performed, whereby the K component is superposed on each of the CMY components. Subsequently, the second conversion processor 46 divides the 8-pixel consecutive input image data of each of the CMY components into two data elements. More specifically, the second conversion processor 46 connects, as shown in (3) of FIG. 7, the first four bits of the C components, the first four bits of the M components, and the first four bits of the Y components in this order so as to generate a first 12-bit divided data element, and also connects, as shown in (4) of FIG. 7, the second four bits of the C components, the second four bits of the M components, and the second four bits of the Y components in this order so as to generate a second 12-bit divided data element.

The second conversion processor 46 then obtains, from the second conversion table 44 shown in (5) of FIG. 7, the 3-byte output value which is stored in association with the input value corresponding to the first 12-bit divided data element, and also obtains the 3-byte output value which is stored in association with the input value corresponding to the second 12-bit divided data element. The second conversion processor 46 then combines the two 3-byte data values so as to output one-pixel output image data to the image output unit 16, as shown in (7) of FIG. 7.

If plane-to-pixel interleave conversion processing is not performed in the second conversion processor 46, for example, if input image data is pixel-interleave-format image data and output image data is also pixel-interleave-format image data, the above-described connection of the CMY components is not necessary. In this case, the second conversion processor 46 reads every set of four pixels of image data from the head of the 8-pixel input image data, and performs conversion processing on each of the sets of four pixels of image data by using the second conversion table 44. In this case, the second conversion table 44 is a conversion table for converting pixel-interleave-format input values into pixel-interleave-format output values. The same applies to a case where plane-to-pixel interleave conversion processing is not performed in the first conversion processor 38. In this case, the connection of CMY components is not performed, and conversion processing using the first conversion table 36 is performed accordingly.

Another specific example of processing performed by the second converter 40 will be described below with reference to FIG. 8. In the example shown in FIG. 8, two second conversion tables 44 are generated.

In the example shown in FIG. 8, processing parameters (N, Bi, Bo, types of input/output color spaces, and k)=(5, 2, 8, CMYK→YCbCr, 3) are set in the second converter 40. In this case, reduction processing is performed with a reduction ratio of 1/5 according to a mean value method. Accordingly, in order to generate one pixel, 5 pixels of input image data are required. In this example, the input image data is divided into 3 data elements. Accordingly, the 5 pixels of the input image data are divided into data elements, i.e., a set of two pixels, a set of two pixels, and a set of one pixel. Each of the data elements is converted at one time by using the corresponding second conversion table 44, and the converted data elements are combined so as to obtain an output value having one pixel. If the common second conversion table is used for the sets of two pixels, it is necessary to generate two second conversion tables, i.e., the second conversion table 44 (hereinafter referred to as the "second conversion table A") corresponding to the sets of two pixels, and the second conversion table 44 (hereinafter referred to as the "second conversion table B") corresponding to the set of one pixel. Since the type of input color space is CMYK and the type of output color space is YCbCr, Ci is 3 (K component is superposed on each of CMY components) and Co is 3.

Thus, the second table value generator 42 generates, as shown in (6) of FIG. 8, the second conversion table A having an input index having 12 bits (2 pixels×2 bits×3 channels) and an output value having 3 bytes (1 pixel×8 bits×3 channels), and also generates, as shown in (7) of FIG. 8, the second conversion table B having an input index having 6 bits (1 pixel×2 bits×3 channels) and an output value having 3 bytes (1 pixel×8 bits×3 channels).

In this example, as the conversion processing, not only number-of-bits conversion and color space conversion, but also plane-to-pixel interleave conversion processing is performed. Thus, the second table value generator 42 generates the second conversion tables A and B for performing such conversion processing. If it is desired that the output values of the second conversion tables A and B reflect the contribution ratios, the output value of the second conversion table A having a contribution ratio 2/5 is generated, and the output value of the second conversion table B having a ratio of 1/5 is generated.

If, as shown in (1) of FIG. 8, the input image data is plane-interleave-format image data described in a CMYK color space in which one pixel is represented by four levels of gradation (two bits), the second conversion processor 46 first superposes, as shown in (2) of FIG. 8, a K component on each of CMY components. As in the above-described examples, in this example, a two-bit addition operation between K component and each of the CMY components is performed, whereby the K component is superposed on each of the CMY components. Subsequently, the second conversion processor 46 divides the 5-pixel consecutive input image data of each of the CMY components into three data elements. More specifically, the second conversion processor 46 connects, as shown in (3) of FIG. 8, the bit string for the first two pixels of the C components, the bit string for the first two pixels of the M components, and the bit string for the first two pixels of the Y components in this order so as to generate a 12-bit divided data element (hereinafter referred to "data a") and also connects, as shown in (4) of FIG. 8, the bit string for the subsequent two pixels of the C components, the bit string for the subsequent two pixels of the M components, and the bit string for the subsequent two pixels of the Y components in this order so as to generate a 12-bit divided data element (hereinafter referred to "data b"). Similarly, the second conversion processor 46 connects, as shown in (5) of FIG. 8, the bit string of the subsequent one pixel of the C components, the bit string of the subsequent one pixel of the M components, and the bit string of the subsequent one pixel of the Y components in this order so as to generate a 6-bit divided data element (hereinafter referred to "data c").

The second conversion processor 46 then obtains, from the second conversion table A shown in (6) of FIG. 8, the output value which is stored in association with the input value corresponding to the data a, and also obtains the output value which is stored in association with the input value corresponding to the data b. The second conversion processor 46 then obtains, from the second conversion table B shown in (7) of FIG. 8, the output value which is stored in association with the input value corresponding to the data c. The second conversion processor 46 then combines the three output values so as to output one-pixel output image data to the image output unit 16, as shown in (9) of FIG. 8.

An example of the generation of the second conversion table 44 by the second table value generator 42 will be discussed below with reference to FIGS. 9A through 9C. As in the example shown in FIG. 7, processing parameters (N, Bo, types of input/output color spaces, and k)=(8, 1, 8, CMYK→YCbCr, 2) are set in the second converter 40 (see also FIG. 9A).

As described above, reduction processing is performed with a reduction ratio of 1/8 according to a mean value method. Accordingly, in order to generate one pixel, 8 pixels of input image data are required. In the second converter 40, input image data is divided into two data elements and the two divided data elements are individually converted, and then, the converted individual data elements are combined so as to obtain one pixel of output image data. Thus, the second conversion table 44 having a 12-bit input index and a 3-byte output value is generated. An example of a generation program (pseudo-code) used for generating that second conversion table 44 is shown in FIG. 9B.

It is possible that the 12-bit input value take a value ranging from 0 to 4095. It is thus necessary to determine output values corresponding to the input values ranging from 0 to 4095. Accordingly, in the section designated by reference numeral 50 in FIG. 9B, the variable i representing the input value changes from 0 to 4095, and the following processing is repeatedly performed on the variable i representing each of the input values.

In the subsequent section designated by reference numeral 52 in FIG. 9B, the number of "1s" of each of the CMY components contained in the input value i is counted, and is multiplied by 255 (number-of-bits conversion). The resulting value is then divided by 4.

The arithmetic expression concerning the C components: in_c=255*(the number of pixel values (cyan) "1s" in (i & 0xf00))/4, which is typical of the three arithmetic expressions designated by reference numeral 52, will be discussed below.

As discussed with reference to FIG. 7, in this conversion processing, 4 pixels of the input image data elements of the C components, 4 pixels of the input image data of the M components, and 4 pixels of the input image data of the Y components are connected in this order so as to generate 12-bit data. The generated 12-bit data is then converted by using the conversion table. Accordingly, the first 4 bits of the 12-bit data are C components, and the subsequent 4 bits are M components, and the last 4 bits are Y components. Then, AND operation (i & 0xf00) between the 12-bit input data i and "0xf00" (hexadecimal) in which the first 4 bits are 1 and the subsequent 8 bits are 0 is performed. As a result, only C components are obtained as they are, and the second half of the 8 bits corresponding to the M components and the Y components are all 0. Then, the number of "1s" in the 4 bits of the C components is counted, and is multiplied by 255. The reason for this is as follows. When converting one bit (two levels of gradation) into 8 bits (256 levels of gradation), "0" in two-level gradation corresponds to "0" in 256-level gradation, and "1" in 2-level gradation correspond to "255" in 256-level gradation.

Further, in the above-described arithmetic expression, after converting the two-level value into the 256-level value, the resulting value is divided by 4. This is because four pixels of each of the CMY components are processed at one time, as described above. In order to implement a reduction ratio of 1/8 according to a mean value method, the number of pixels is reduced to 1/4 in this step.

The arithmetic expressions concerning M components (in_m) and Y components (in_y) designated by reference numeral 52 in FIG. 9B are similar to that concerning the C components, except that the values of i and the values used for AND operation are different. An explanation thereof is thus omitted.

Then, in the section designated by reference numeral 54 in FIG. 9B, the CMY color space is converted into the YCbCr color space by using the function cmy2ycbcr( ). This function is general conversion expressions determined by the definition of the color spaces or a conversion scheme modified in accordance with the color reproduction of the device (conversion expressions or multidimensional table processing). The solutions in_c, in_m, and in_y found in the arithmetic expressions indicated in the section designated by reference numeral 52 are information given to the function cmy2ycbcr( ). The values of the Y components, Cb components, Cr components obtained by converting that information by using the conversion expressions, etc., are set in out_y (Y components), out_cb (Cb components), and out_cr (Cr components).

In the three lines designated by reference numeral 56 in FIG. 9B, the values obtained by dividing out_y, out_cb, and out_cr determined by using the function cmy2ycbcr( ) by 2 (multiplied by a contribution ratio of 1/2) are set in a two-dimensional arrangement, which is called as a table.

As discussed above, the output values of the input index i (0 to 4095) of the second conversion table 44 are determined and are stored in the two-dimensional arrangement, thereby generating the table values of the second conversion table 44. If the second conversion table 44 having the table values determined as described above is used, the composing unit 46B combines the output values by using the above-described first composition mode.

In the above-described example, when performing reduction processing with a reduction ratio of 1/8 in the fast scanning direction, the output values are determined by performing 1/4 multiplication processing (designated by 52) and 1/2 multiplication processing (designated by 56). However, as indicated by pseudo-code shown in FIG. 9C, output values of the second conversion table 44 may be determined without performing such division processing.

In this case, in the function cmy2ycbcr( ) of the conversion program shown in FIG. 9C, the range/domain for performing color space conversion is not 0 through 255 but 0 through 255*4. In the table [i][0], the table [i][1], and the table [i][2], the number of bits (i.e., the size and the capacity of each of the elements stored in the two-dimensional arrangement) is increased and secured to such a degree at least as to store the above-described values of the domain, and the above-described values are stored. If the second conversion table 44 having the table values determined as described above is used, the composing unit 46B combines the output values by using the above-described third composition mode. That is, the composing unit 46B adds the data values obtained by performing conversion processing using the second conversion table 44, and divides the total value by 8 so as to generate one-pixel output image data.

Alternatively, the second conversion table 44 may be generated by performing 1/4 multiplication in the arithmetic expressions designated by reference numeral 52 and by not performing 1/2 multiplication in the arithmetic expressions designated by reference numeral 56. In this case, the second conversion processor 46 multiplies each of the two output values obtained by performing conversion processing by using the second conversion table 44 by 1/2, and then adds the resulting output values so as to generate one-pixel output image data. Alternatively, in this case, since the contribution ratios for the output values are the same, the second conversion processor 46 may add the output values obtained by performing conversion processing by using the second conversion table 44 and may then multiply the total value by ½. That is, in this case, the composing unit 46B combines the output values by using the above-described second composition mode.

If it is desired that reduction processing is also performed in the slow scanning direction with a reduction ratio of 1/Ny according to a mean value method, processing may be performed as follows.

If the second conversion table 44 has been generated by using the processing program shown in FIG. 9B, the data values obtained by converting the input values by using the second conversion table 44 are added. Then, the total values for Ny lines in the slow scanning direction are added, and the resulting value is divided by Ny.

If the second conversion table 44 has been generated by using the processing program shown in FIG. 9C, the data values obtained by converting the input values by using the second conversion table 44 are added. Then, the total values for Ny lines in the slow scanning direction are added, and the resulting value is divided by N (=8)×Ny.

Concerning the generation of the first conversion table 36 by using the first table value generator 34, a conversion table in which input values for α×N pixels are associated with output values for α×1 pixels which are obtained as a result of conversion processing by using the first conversion processor 38 is simply generated. A detailed explanation thereof is thus omitted.

In the above-described exemplary embodiment, reduction processing and conversion processing are performed by the first converter 32 and the second converter 40, and the conversion processing includes number-of-bits conversion (number-of-gradation-levels conversion), plane-to-pixel interleave conversion, and color space conversion. However, the conversion processing is not restricted to those kinds of processing, and it suffices that the conversion processing includes at least one of the number-of-bits conversion (number-of-gradation-levels conversion) and the color space conversion.

In the above-described exemplary embodiment, the input image data is plane-interleave-format image data. However, the input image data may be formed as different files for the individual channels of the color space. The input image data which is formed as different files for the individual channels is treated as data comparable to the plane-interleave-format image data, and is converted into pixel-interleave-format output image data in a manner similar to the above-described exemplary embodiment.

In the above-described exemplary embodiment, the processing controller 30 selects the first converter 32 or the second converter 40 so as to cause the selected converter to perform conversion processing. However, conversion processing may be performed only by the second converter 40 without providing the first converter 32. In this case, the processing controller 30 may execute step 120 through step 130 of FIG. 5 so as to determine the value k, and may input the value k into the second converter 40 as the processing parameter. Also in this case, if the reduction ratio is fixed, it is not necessary to generate a second conversion table 44 for each reduction ratio. Thus, the second table value generator 42 may not be provided, and the second conversion table 44 may be generated and set in the image processing apparatus 10 in advance (i.e., the second conversion table 44 is fixed).

In the above-described exemplary embodiment, image data input from the image input unit 14 is subjected to conversion processing, and is output to the image output unit 16. Alternatively, conversion processing may be performed on image data stored in a storage unit provided in the image processing apparatus 10. Additionally, the input image data subjected to conversion processing may be output to and stored in, for example, a storage unit provided in the image processing apparatus 10, or may be output to another apparatus connected to the image processing apparatus 10 via a communication medium.

The image processing apparatus 10 described in this exemplary embodiment may be used, for example, when thumbnails (reduced-size versions of pictures) are generated from input images received from a digital camera, a scanner, etc., and are displayed. The image processing apparatus 10 may also be used when icons indicating image data or document data are displayed as thumbnails in a folder or on a desktop of a computer. The image processing apparatus 10 may be formed as a multifunction apparatus incorporating plural functions, such as copying, printing, scanning, and FAX functions, and may be used for generating log images for a security reason, for example, when reduced versions of images of the documents that have been processed are stored or displayed. Further, in a display apparatus to allow a user to check images which are screened for printing, the image processing apparatus 10 may be used for generating low-resolution and multilevel (greater than two levels) reduced images from high-resolution and two-level gradation printing images in order to check the entire printed image.

Further, when reduced versions of a large number of high-resolution images stored in, for example, a server are generated displayed as thumbnails, and a group of thumbnails are displayed together on a terminal, the above-described exemplary embodiment may be applied to processing for generating such thumbnails in the server.

In the above-described exemplary embodiment, a program, which serves as an example of the above-described conversion processing program used in the image processing apparatus 10, is stored in the storage unit 12C of the apparatus controller 12. However, such a program may be provided in the form of a recording medium, such as a CD-ROM or a digital versatile disk (DVD)-ROM, storing the program therein. Additionally, in the above-described exemplary embodiment, the CPU 12A executes the program so as to implement the processing controller 30, the first converter 32, and the second converter 40. However, those components may be implemented by use of hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a division-conversion unit that extracts data representing N pixels (N is an integer of two or greater) from image data, divides the extracted data representing N pixels into k (2≦k≦N) divided data elements such that at least one pixel is described in each of the k divided data elements, and converts each of the k divided data elements into a single piece of data by using a conversion table, the conversion table being provided in accordance with the number of pixels described in each of the k divided data elements and being used for converting the corresponding k divided data element into the single piece of data by performing conversion processing including at least one of number-of-bits conversion processing for converting the number of bits per pixel and color space conversion processing; and
    a composing unit that combines the single pieces of data obtained by converting the k divided data elements by use of the division-conversion unit so as to generate output data representing one pixel which is reduced from the extracted data representing N pixels with a reduction ratio of 1/N.

2. The image processing apparatus according to claim 1, further comprising:

a non-division-conversion unit that extracts data representing α×N pixels (α is an integer of one or greater) from image data and that converts the extracted data representing α×N pixels into data representing α pixels by using a conversion table, the conversion table being used for converting the extracted data representing α×N pixels into the data representing α pixels by performing the conversion processing; and a controller that determines a table size of the conversion table used by the non-division-conversion unit, assuming that α is one, on the basis of processing conditions that define the reduction ratio and the content of the conversion processing, and that performs control, if the determined table size is smaller than a predetermined threshold, so that α is set to be a maximum value as long as the table size of the conversion table used by the non-division-conversion unit does not exceed the predetermined threshold and so that the image data is subjected to the conversion processing and is reduced with a reduction ratio of 1/N by using the non-division-conversion unit, and that performs control, if the determined table size is equal to or greater than the predetermined threshold, so that the image data is subjected to the conversion processing and is reduced with a reduction ratio of 1/N by using the division-conversion unit and the composing unit.

3. The image processing apparatus according to claim 2, wherein:

the division-conversion unit and the non-division-conversion unit perform, as the conversion processing, at least the color space conversion processing and plane-to-pixel interleave conversion processing for converting a plane interleave format into a pixel interleave format;

the division-conversion unit extracts, from the image data, data representing N pixels of each of channels of a color space which has not been subjected to the color space conversion processing, divides the extracted data representing N pixels of each of the channels into k data elements, connects the corresponding k data elements of the individual channels so as to generate k divided data elements, and converts each of the k divided data elements by using a conversion table, the conversion table being provided in accordance with the number of pixels described in each of the k divided data elements and being used for converting the corresponding k divided data element into a single piece of data in which data elements of individual channels of a color space subjected to at least the color space conversion processing are continuously arranged; and the non-division-conversion unit extracts, from the image data, a data element representing α×N pixels of each of channels of a color space which has not been subjected to the color space conversion processing, connects the extracted data elements of the individual channels, and converts the extracted data elements representing α×N pixels into data representing α consecutive pixels by using a conversion table, the conversion table being used for converting the connected data elements of the individual channels into the data representing α consecutive pixels, each of the α consecutive pixels represented by one-pixel data in which data elements of individual channels of a color space subjected to at least the color space conversion processing are continuously arranged.

4. The image processing apparatus according to claim 2, wherein the division-conversion unit and the non-division-conversion unit perform, as the conversion processing, at least the color space conversion processing, and if a color space which has not been subjected to the color space conversion processing is a CMYK color space, a K component is superposed on each of a C component, an M component, and a Y component before performing the conversion processing by using a conversion table.

5. An image processing method comprising:

extracting data representing N pixels (N is an integer of two or greater) from image data, dividing the extracted data representing N pixels into k (2≦k≦N) divided data elements such that at least one pixel is described in each of the k divided data elements, and converting each of the k divided data elements into a single piece of data by using a conversion table, the conversion table being provided in accordance with the number of pixels described in each of the k divided data elements and being used for converting the corresponding k divided data element into the single piece of data by performing conversion processing including at least one of number-of-bits conversion processing for converting the number of bits per pixel and color space conversion processing; and combining the single pieces of data obtained by converting the k divided data elements so as to generate output data representing one pixel which is reduced from the extracted data representing N pixels with a reduction ratio of 1/N.

6. A non-transitory computer readable medium storing a program causing a computer to execute a process, the process comprising:

extracting data representing N pixels (N is an integer of two or greater) from image data, dividing the extracted data representing N pixels into k (2≦k≦N) divided data elements such that at least one pixel is described in each of the k divided data elements, and converting each of the k divided data elements into a single piece of data by using a conversion table, the conversion table being provided in accordance with the number of pixels described in each of the k divided data elements and being used for converting the corresponding k divided data element into the single piece of data by performing conversion processing including at least one of number-of-bits conversion processing for converting the number of bits per pixel and color space conversion processing; and combining the single pieces of data obtained by converting the k divided data elements so as to generate output data representing one pixel which is reduced from the extracted data representing N pixels with a reduction ratio of 1/N.

\* \* \* \* \*